(12) United States Patent
Metz et al.

(10) Patent No.: US 10,088,027 B2
(45) Date of Patent: Oct. 2, 2018

(54) TORSIONAL VIBRATION DAMPER WITH AN INTEGRATED TILGER DRIVE PLATE AND A TORQUE CONVERTER WITH A TORSIONAL VIBRATION DAMPER WITH AN INTEGRATED TILGER DRIVE PLATE

(71) Applicant: Schaeffler Technologies AG & Co. KG, Herzogenaurach (DE)

(72) Inventors: Sean Metz, Smithville, OH (US); Justin Clark, Cortland, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 316 days.

(21) Appl. No.: 15/183,990

(22) Filed: Jun. 16, 2016

(65) Prior Publication Data

US 2017/0363190 A1    Dec. 21, 2017

(51) Int. Cl.

| F16H 45/02 | (2006.01) |
| F16H 41/24 | (2006.01) |
| F16D 25/06 | (2006.01) |
| F16H 41/04 | (2006.01) |
| F16F 15/121 | (2006.01) |

(52) U.S. Cl.
CPC .............. *F16H 41/24* (2013.01); *F16D 25/06* (2013.01); *F16F 15/121* (2013.01); *F16H 41/04* (2013.01); *F16F 2232/02* (2013.01); *F16F 2236/08* (2013.01); *F16H 45/02* (2013.01)

(58) Field of Classification Search
CPC . F16H 41/00–41/32; F16H 45/00–2045/0294; F16H 45/02; F16F 15/121; F16F 2236/08; F16F 2232/02; F16D 25/06
See application file for complete search history.

(56) References Cited

U.S. PATENT DOCUMENTS

| 5,713,442 | A  | * | 2/1998 | Murata | F16F 1/041 |
| | | | | | 192/213.2 |
| 8,403,762 | B2 | | 3/2013 | Steinberger | |
| 8,746,424 | B2 | | 6/2014 | Kneidel | |
| 9,732,835 | B2 | * | 8/2017 | Kawahara | F16F 15/1421 |
| 2012/0073925 | A1 | | 3/2012 | Kneidel | |
| 2015/0023781 | A1 | * | 1/2015 | Takikawa | F16H 45/02 |
| | | | | | 415/119 |

\* cited by examiner

*Primary Examiner* — Ramya P Burgess
*Assistant Examiner* — Lillian T Nguyen
(74) *Attorney, Agent, or Firm* — LeKeisha M. Suggs

(57) ABSTRACT

A torque converter, including: a cover to receive torque; an impeller including an impeller shell non-rotatably connected to the cover and an impeller blade; a turbine including a turbine shell and a turbine blade; a first vibration damper including a drive plate to receive torque from the cover, a first cover plate including first and second portions, a first spring directly engaged with the drive plate and the first portion of the first cover plate, and a second cover plate non-rotatably connected to the first cover plate, surrounding a portion of the first spring in a direction orthogonal to a longitudinal axis for the first spring, and including an opening; and a second vibration damper including a cover plate non-rotatably connected to the turbine shell, and a second spring directly engaged with the cover plate for the second vibration damper and with the second portion of the first cover plate.

20 Claims, 5 Drawing Sheets ent application;

TORSIONAL VIBRATION DAMPER WITH AN INTEGRATED TILGER DRIVE PLATE AND A TORQUE CONVERTER WITH A TORSIONAL VIBRATION DAMPER WITH AN INTEGRATED TILGER DRIVE PLATE

TECHNICAL FIELD

Described herein is a vibration damper with an integrated tilger drive plate, in particular, a tilger drive plate formed integrally with a cover plate for a series damper. Also described herein is a torque converter including a vibration damper with an integrated tilger drive plate

BACKGROUND

FIG. 4 is a partial cross-sectional view of prior art torque converter 200. Converter 200 includes series vibration damper 202 and tilger vibration damper 204. Damper 204 includes drive plate 206, plate 208 non-rotatably connected to turbine shell 210, and spring 212 engaged with plates 206 and 208. Drive plate 206 is a separate piece non-rotatably connected to cover plate 214 for damper 202.

FIG. 5 is a partial cross-sectional view of prior art torque converter 300. Converter 300 includes series vibration damper 302 and tilger vibration damper 304. Damper 304 includes drive plate 306, plate 308 non-rotatably connected to turbine shell 310, and spring 312 engaged with plates 306 and 308. Drive plate 306 is formed by a portion of cover plate 314 for damper 302.

SUMMARY

According to aspects illustrated herein, there is provided a vibration damper assembly, including: an axis of rotation; a first vibration damper including a drive plate arranged to receive torque from a cover for a torque converter, a first cover plate including first and second portions, a first spring directly engaged with the drive plate and the first portion of the first cover plate, and a second cover plate non-rotatably connected to the first cover plate, surrounding a portion of the first spring in a direction orthogonal to a longitudinal axis for the first spring, and including an opening; and a second vibration damper including a cover plate arranged to non-rotatably connect to a turbine shell for the torque converter, and a second spring directly engaged with the cover plate for the second vibration damper and with the second portion of the first cover plate.

According to aspects illustrated herein, there is provided a torque converter, including: an axis of rotation; a cover arranged to receive torque from an engine; an impeller including an impeller shell non-rotatably connected to the cover and at least one impeller blade; a turbine including a turbine shell and at least one turbine blade; a first vibration damper including a drive plate arranged to receive torque from the cover, a first cover plate including first and second portions, a first spring directly engaged with the drive plate and the first portion of the first cover plate, and a second cover plate non-rotatably connected to the first cover plate, surrounding a portion of the a first spring in a direction orthogonal to a longitudinal axis for the first spring, and including an opening; and a second vibration damper including a cover plate non-rotatably connected to the turbine shell, and a second spring directly engaged with the cover plate for the second vibration damper and with the second portion of the first cover plate.

According to aspects illustrated herein, there is provided a torque converter, including: an axis of rotation; a cover arranged to receive torque from an engine; an impeller including an impeller shell non-rotatably connected to the cover and at least one impeller blade; a turbine including a turbine shell and at least one turbine blade; a first vibration damper including a drive plate arranged to receive torque from the cover, a first cover plate including first, second, and third portions, a first spring directly engaged with the drive plate and the first portion of the first cover plate, and a second cover plate non-rotatably connected to the first cover plate, surrounding a portion of the first spring in a direction orthogonal to a longitudinal axis for the first spring, and including an opening with first and second edges formed by material forming the second cover plate; and a second vibration damper including a cover plate non-rotatably connected to the turbine shell, and a second spring directly engaged with the cover plate for the second vibration damper and with the second portion of the first cover plate. A line orthogonal to the axis of rotation passes through in sequence: the first edge of the opening; the third portion of the first cover plate; and the second edge of the opening.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
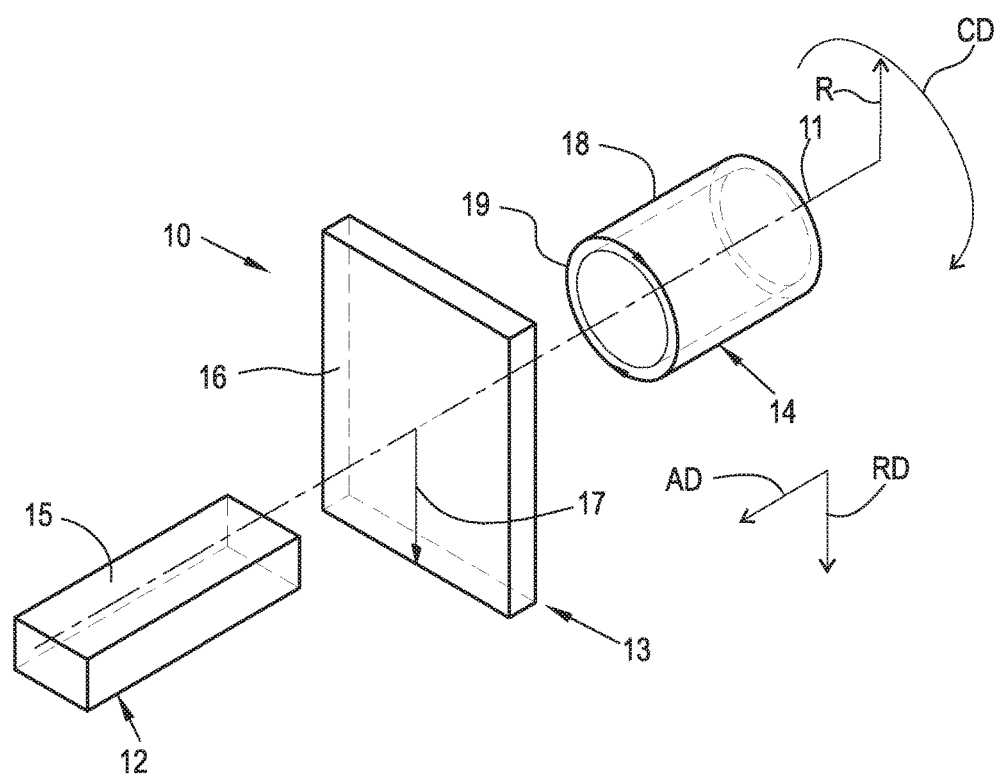
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
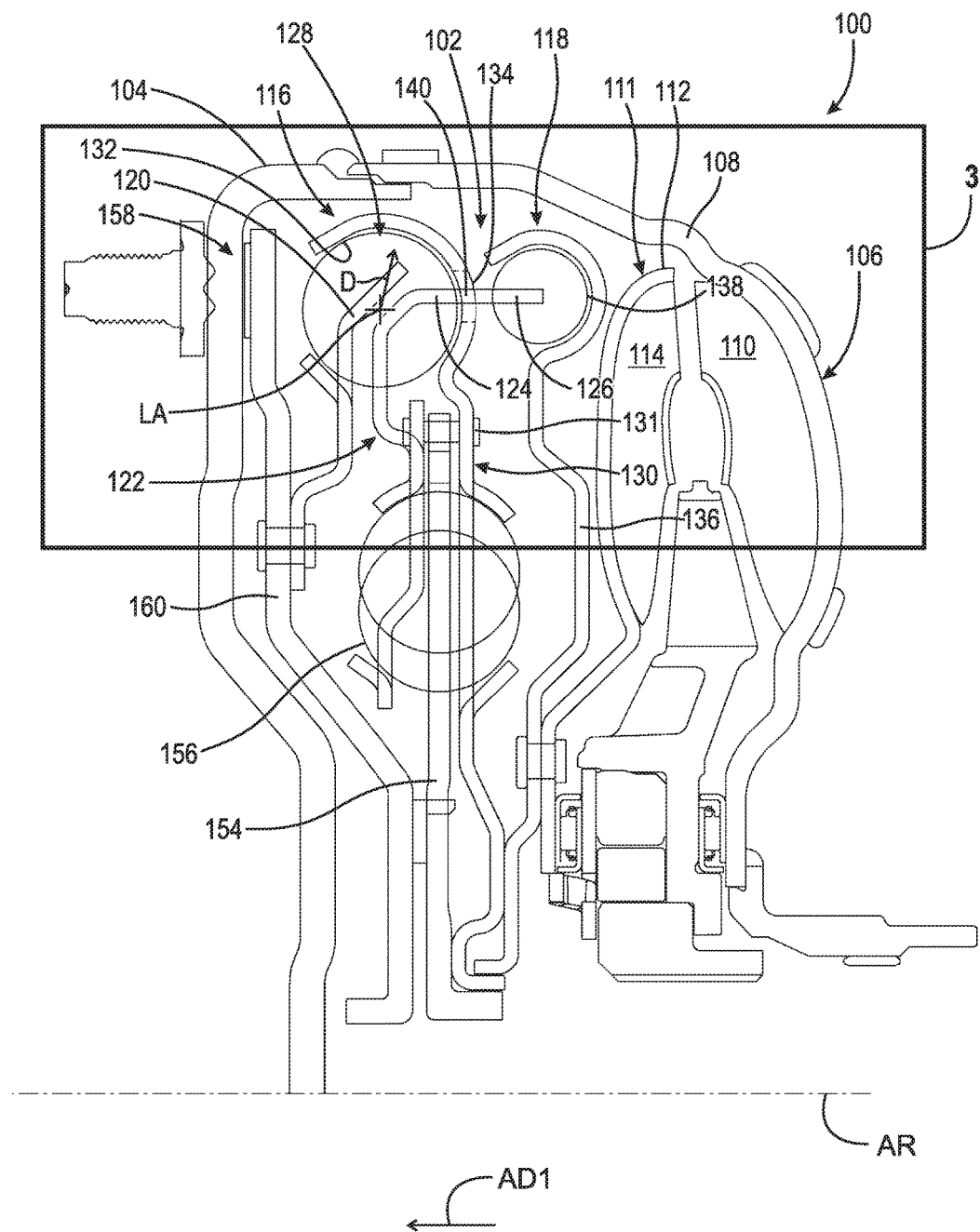
FIG. 2 is a partial cross-sectional view of a torque converter having a vibration damper assembly with an integrated tilger drive plate.

FIG. 2 is a partial cross-sectional view of torque converter 100 having vibration damper assembly 102 with an integrated tilger drive plate. Torque converter 100 includes: axis of rotation AR; cover 104 arranged to receive torque from an engine (not shown); impeller 106 including impeller shell 108, non-rotatably connected cover 104, and at least one impeller blade 110; and turbine 111 including shell 112 and at least one turbine blade 114. Assembly 102 includes vibration damper 116 and tilger vibration damper 118. Damper 116 includes: drive plate 120 arranged to receive torque from cover 104; cover plate 122 including portions 124 and 126; spring 128 directly engaged drive plate 120 and portion 124; and cover plate 130. Plate 130: is non-rotatably connected to cover plate 122, for example by fastener 131; surrounds portion 132 of spring 128 in direction D orthogonal to longitudinal axis LA for spring 128; and includes opening 134. Damper 118 includes cover plate 136 non-rotatably connected to turbine shell 112; and spring 138 directly engaged with cover plate 136 and portion 126.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required. By "directly engaged" elements we mean that the elements are either in direct contact with each other or are joined by ancillary parts that form a solid mechanical bridge between the elements, for example, a cap on the end of a spring in a vibration damper in contact with the spring and a plate for the vibration damper.

Figure 3:
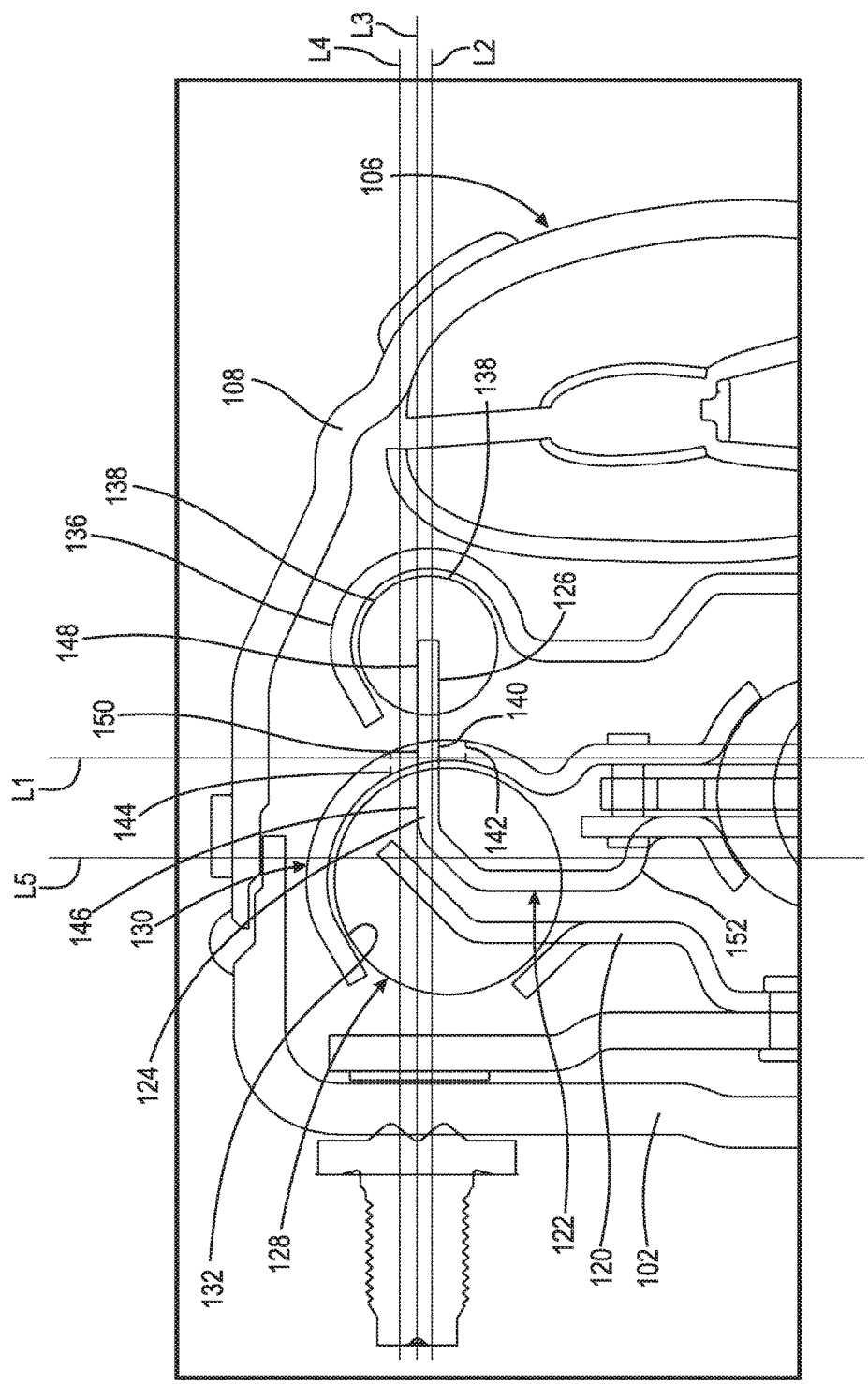
FIG. 3 is a detail of area 3 in FIG. 2.
Figure 4:
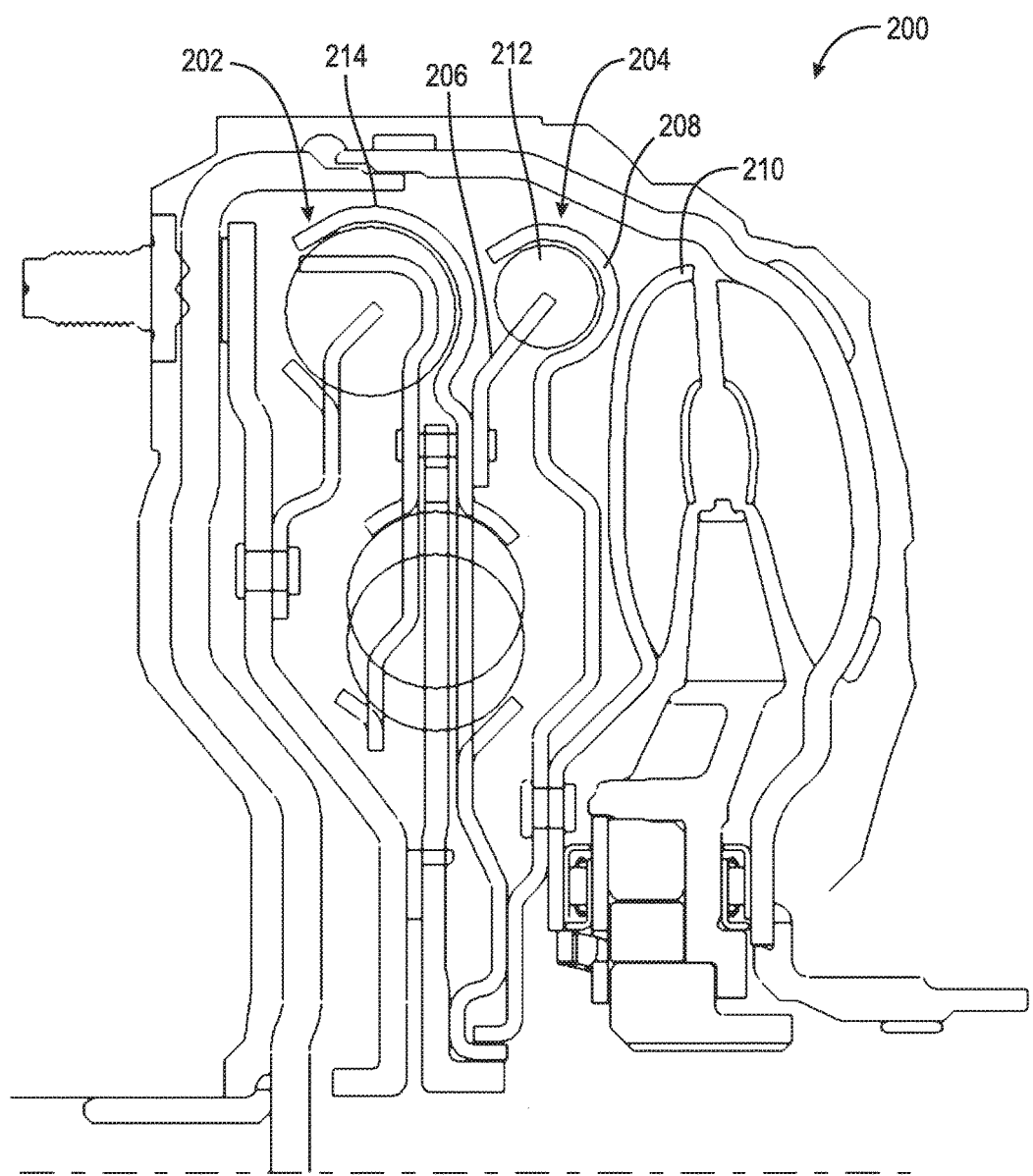
FIG. 4 is a partial cross-sectional view of a prior art torque converter with a tilger vibration damper; and, FIG. 5 is a partial cross-sectional view of a prior art torque converter with a tilger vibration damper.
Figure 5:
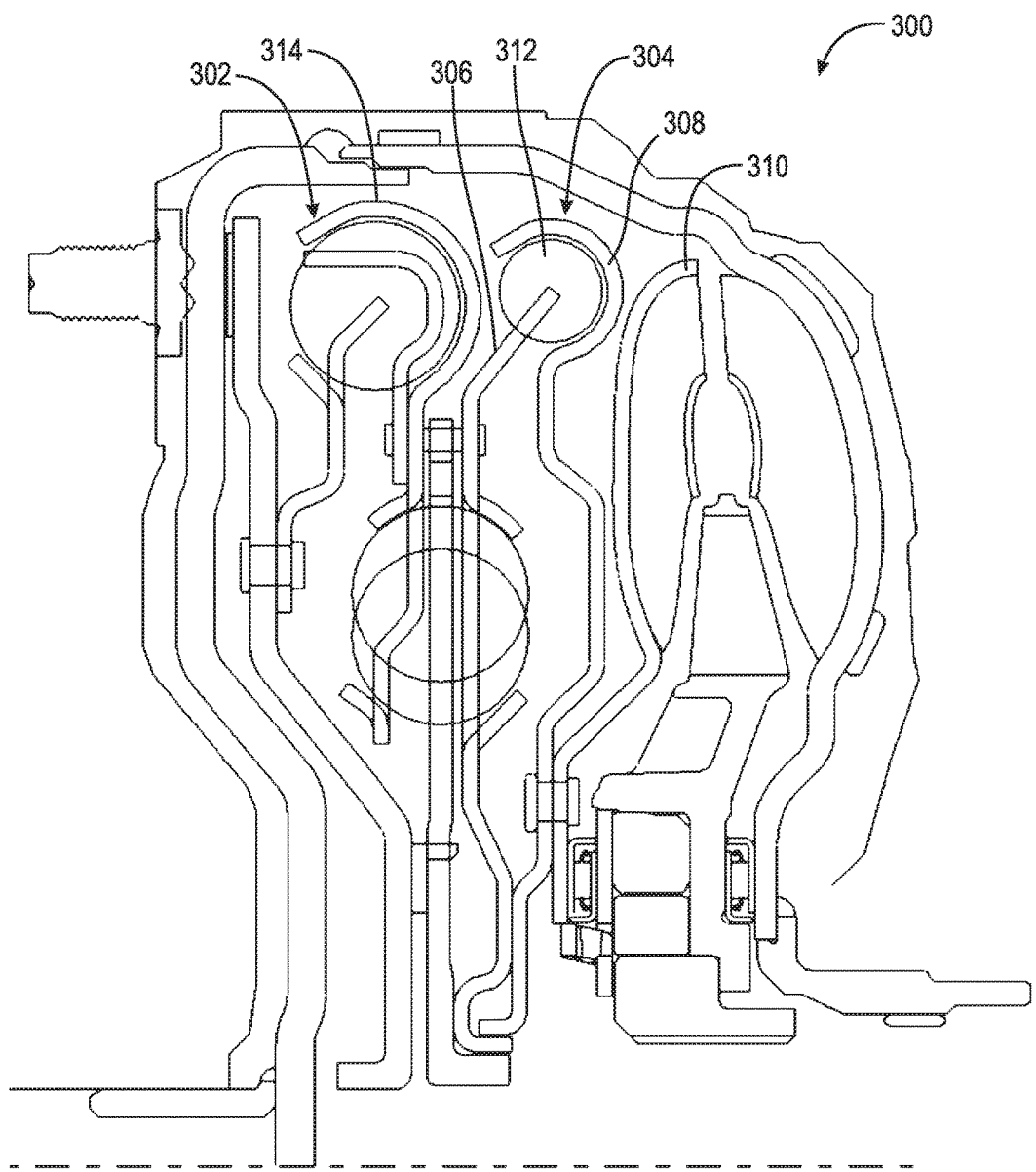

FIG. 3 is a detail of area 3 in FIG. 2. The following should be viewed in light of FIGS. 2 and 3. Cover plate 122 includes portion 140 axially located between portions 124 and 126. In an example embodiment, line L1, orthogonal to axis of rotation AR, passes through in sequence: edge 142 of opening 134; portion 140; and edge 144 of opening 134. Edges 142 and 144 are formed by material forming cover plate 130. In an example embodiment, line L2, parallel to axis of rotation AR, passes through in sequence: portion 124, portion 140, portion 126, and plate 136.

Portions 124, 126, and 140 include radially outwardly facing surfaces 146, 148, and 150, respectively. In an example embodiment, line L3, parallel to axis of rotation AR, is co-linear with surfaces 146, 148 and 150. In an example embodiment, line L4, parallel to axis of rotation AR, passes through in sequence: spring 128; opening 134; spring 138; and cover plate 136. Cover plate 122 includes portion 152 radially inward of portion 124. In an example embodiment, line L5, orthogonal to axis of rotation AR, passes through in sequence: portion 152; spring 128; portion 124; and cover plate 130.

In an example embodiment, damper 116 is a series damper including: output flange 154 arranged to non-rotatably connect to an input shaft (not shown) for a transmission; and spring 156 directly engaged with cover plate 122, cover plate 130, and output flange 154. In an example embodiment, clutch 100 includes lock-up clutch 158 including piston 160. Drive plate 120 is non-rotatably connected to piston 160 and piston 160 is axially displaceable in direction AD1 to non-rotatably connect cover 104 and drive plate 120.

Advantageously, damper assembly 102 reduces the parts count needed for a torque converter with a damper and a tilger damper by integrating the drive plate for the tilger damper with a cover or retaining plate for the damper. In particular, portion 126 of cover plate 122 for damper 116 forms the drive plate for tilger damper 118 and portion 140 of cover plate 122 pass through opening 134.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A vibration damper assembly, comprising:
   an axis of rotation;
   a first vibration damper including:
      a drive plate arranged to receive torque from a cover for a torque converter;
      a first cover plate including first and second portions;
      a first spring directly engaged with the drive plate and the first portion of the first cover plate; and,
      a second cover plate:
         non-rotatably connected to the first cover plate;
         surrounding a portion of the first spring in a direction orthogonal to a longitudinal axis for the first spring; and,
         including an opening; and,
   a second vibration damper including:
      a cover plate arranged to non-rotatably connect to a turbine shell for the torque converter; and, a second spring directly engaged with the cover plate for the second vibration damper and the second portion of the first cover plate.

2. The vibration damper assembly of claim 1, wherein:
the first cover plate includes a third portion;
a line orthogonal to the axis of rotation passes through in sequence: a first edge of the opening; the third portion of the first cover plate; and a second edge of the opening; and,
the first and second edges are formed by material forming the second cover plate.

3. The vibration damper assembly of claim 2, wherein the third portion of the first cover plate is axially located between the first and second portions of the first cover plate.

4. The vibration damper assembly of claim 2, wherein a line parallel to the axis of rotation passes through in sequence: the first portion of the first cover plate; the third portion of the first cover plate; the second portion of the first cover plate; and the cover plate for the second vibration damper.

5. The vibration damper assembly of claim 2, wherein:
the first portion of the first cover plate includes a first radially outwardly facing surface;
the second portion of the first cover plate includes a second radially outwardly facing surface;
the third portion of the first cover plate includes a third radially outwardly facing surface; and,
a line parallel to the axis of rotation is co-linear with the first, second and third radially outwardly facing surfaces.

6. The vibration damper assembly of claim 1, wherein a line parallel to the axis of rotation passes through in sequence: the first spring; the opening; the second spring; and the cover plate for the second vibration damper.

7. The vibration damper assembly of claim 1, wherein:
the first cover plate includes a third portion radially inward of the first portion of the first cover plate; and,
a line orthogonal to the axis of rotation passes through in sequence: the third portion of the first cover plate; the first spring; the first portion of the first cover plate; and the second cover plate.

8. The vibration damper assembly of claim 1, wherein:
the first portion of the first cover plate includes a first radially outwardly facing surface;
the second portion of the first cover plate includes a second radially outwardly facing surface; and,
a line parallel to the axis of rotation is co-linear with the first and second radially outwardly facing surfaces.

9. The vibration damper assembly of claim 1, wherein the first vibration damper includes:
an output flange arranged to non-rotatably connect to an input shaft for a transmission; and,
a third spring directly engaged with the first cover plate, the second cover plate, and the output flange.

10. A torque converter, comprising:
an axis of rotation;
a cover arranged to receive torque from an engine;
an impeller including:
an impeller shell non-rotatably connected to the cover; and,
at least one impeller blade;
a turbine including:
a turbine shell; and,
at least one turbine blade;
a first vibration damper including:
a drive plate arranged to receive torque from the cover;
a first cover plate including first and second portions;
a first spring directly engaged with the drive plate and the first portion of the first cover plate; and,
a second cover plate:
non-rotatably connected to the first cover plate;
surrounding a portion of the first spring in a direction orthogonal to a longitudinal axis for the first spring; and,
including an opening; and,
a second vibration damper including:
a cover plate non-rotatably connected to the turbine shell; and,
a second spring directly engaged with the cover plate for the second vibration damper and with the second portion of the first cover plate.

11. The torque converter of claim 10, wherein:
the first cover plate includes a third portion;
a line orthogonal to the axis of rotation passes through in sequence: a first edge of the opening; the third portion of the first cover plate; and a second edge of the opening; and,
the first and second edges are formed by material forming the second cover plate.

12. The torque converter of claim 11, wherein the third portion of the first cover plate is axially located between the first and second portions of the first cover plate.

13. The torque converter of claim 11, wherein a line parallel to the axis of rotation passes through in sequence: the first portion of the first cover plate; the third portion of the first cover plate; the second portion of the first cover plate; and the cover plate for the second vibration damper.

14. The torque converter of claim 11, wherein:
the first portion of the first cover plate includes a first radially outwardly facing surface;
the second portion of the first cover plate includes a second radially outwardly facing surface;
the third portion of the first cover plate includes a third radially outwardly facing surface; and,
a line parallel to the axis of rotation is co-linear with the first, second and third radially outwardly facing surfaces.

15. The torque converter of claim 10, wherein a line parallel to the axis of rotation passes through in sequence: the first spring; the opening; the second spring; and the cover plate for the second vibration damper.

16. The torque converter of claim 10, wherein:
the first cover plate includes a third portion radially inward of the first portion of the first cover plate; and,
a line orthogonal to the axis of rotation passes through in sequence: the third portion of the first cover plate; the first spring; the first portion of the first cover plate; and the second cover plate.

17. The torque converter of claim 10, wherein:
the first portion of the first cover plate includes a first radially outwardly facing surface;
the second portion of the first cover plate includes a second radially outwardly facing surface; and,
a line parallel to the axis of rotation is co-linear with the first and second radially outwardly facing surfaces.

18. The torque converter of claim 10, wherein the first vibration damper includes:
an output flange arranged to non-rotatably connect to an input shaft for a transmission; and,
a third spring directly engaged with the first cover plate, the second cover plate, and the output flange.

19. The torque converter of claim 10, further comprising:
a lock-up clutch including a piston, wherein:
   the drive plate is non-rotatably connected to the piston; and,
   the piston is axially displaceable to non-rotatably connect the cover and the drive plate.

20. A torque converter, comprising:
an axis of rotation;
a cover arranged to receive torque from an engine;
an impeller including:
   an impeller shell non-rotatably connected to the cover; and,
   at least one impeller blade;
a turbine including:
   a turbine shell; and,
   at least one turbine blade;
a first vibration damper including:
   a drive plate arranged to receive torque from the cover;
   a first cover plate including first, second, and third portions;
   a first spring directly engaged with the drive plate and the first portion of the first cover plate; and,
   a second cover plate:
      non-rotatably connected to the first cover plate;
      surrounding a portion of the first spring in a direction orthogonal to a longitudinal axis for the first spring; and,
      including an opening with first and second edges formed by material forming the second cover plate; and,
a second vibration damper including:
   a cover plate non-rotatably connected to the turbine shell; and,
   a second spring directly engaged with the cover plate for the second vibration damper and with the second portion of the first cover plate, wherein a line orthogonal to the axis of rotation passes through in sequence: the first edge of the opening; the third portion of the first cover plate; and the second edge of the opening.

* * * * *